United States Patent [19]
Wertheim et al.

[11] Patent Number: 5,951,629
[45] Date of Patent: Sep. 14, 1999

[54] METHOD AND APPARATUS FOR LOG CONVERSION WITH SCALING

[75] Inventors: Elon Wertheim, Hod-Hasharon; Dahan Zion, Kiryat-Gat; Yaron Ben-Arie, Ramat-Gan, all of Israel; Shao-Wei Pan, Lake Zurich, Ill.

[73] Assignee: Motorola, Inc., Schaumburg, Ill.

[21] Appl. No.: 08/929,607

[22] Filed: Sep. 15, 1997

[51] Int. Cl.[6] .............................. G06F 7/556; G06F 5/01
[52] U.S. Cl. ........................................ 708/517; 708/277
[58] Field of Search ........................... 364/748.5, 748.18, 364/715.07; 708/517, 512, 208, 277

[56] References Cited

U.S. PATENT DOCUMENTS

| | | | |
|---|---|---|---|
| 3,371,197 | 2/1968 | Munson | 364/748.5 |
| 4,720,809 | 1/1988 | Taylor | 364/748.5 |
| 5,642,305 | 6/1997 | Pan et al. | 364/748.5 |
| 5,657,263 | 8/1997 | Lloyd et al. | 364/748.5 |
| 5,696,986 | 12/1997 | Pan et al. | 364/748.5 |
| 5,703,801 | 12/1997 | Pan et al. | 364/748.5 |
| 5,798,957 | 8/1998 | Pan et al. | 364/748.5 |

*Primary Examiner*—David H. Malzahn
*Attorney, Agent, or Firm*—James E. Gauger

[57] ABSTRACT

A parallel processor (110) operates in the LOG domain. A LOG converter (114) receives input data in the NORMAL and converts it to the LOG domain for processing in the parallel processing units PPU-k. Scaling of the input data, is performed in the LOG converter (114) without need for additional multipliers. A constant factor is added to the LOG input data during the LOG conversion process using existing LOG adders already present to perform the LOG conversion. Thus, less total circuitry is needed and the processor can be made more compact, more efficient and less costly.

20 Claims, 6 Drawing Sheets

METHOD AND APPARATUS FOR LOG CONVERSION WITH SCALING

FIELD OF THE INVENTION

The present invention relates generally to computing circuits and, in particular, to a computing circuit which can be used to perform a scaling or quantization operation on an input value.

RELATED INVENTIONS

The present invention is related to the following inventions which are assigned to the same assignee as the present invention:

1. "Computer Processor Utilizing Logarithmic Conversion and Method of Use Thereof", having Ser. No. 08/403,158, filed on Mar 13, 1995 now U.S. Pat. No. 5,685,008.
2. "Logarithm/Inverse-Logarithm Converter and Method of Using Same", having Ser. No. 08/381,368, filed on Jan. 31, 1995 now U.S. Pat. No. 5,642,305.
3. "Logarithm/Inverse-Logarithm Converter Utilizing a Truncated Taylor Series and Method of Use Thereof", having Ser. No. 08/381,167, filed on Jan. 31, 1995 now U.S. Pat. No. 5,604,691.
4. "Logarithm/Inverse-Logarithm Converter Utilizing Linear Interpolation and Method of Using Same", now U.S. Pat. No. 5,600,581;
5. "Logarithm Converter Utilizing Offset and Method of Using Same", now U.S. Pat. No. 5,629,884;
6. "Computer Processor having a Pipelined Architecture and Method of Using Same", Ser. No. 08/520,666, filed Aug. 28, 1995 now U.S. Pat. No. 5,771,391.
7. "Logarithm/Inverse-Logarithm Converter Using Second-Order Term and Method of Using Same", Ser. No. 08/382,467, filed Jan. 31, 1995 now U.S. Pat. No. 5,703,801.

The foregoing are incorporated herein by reference.

BACKGROUND OF THE INVENTION

It is often necessary in the electronic arts to evaluate expressions of the general form given in Eq. (1):

$$X = F * C \qquad (1)$$

where X, F and C are matrices or a combination of matrices and vectors.

It is known that such expressions can be evaluated by means of the following equation:

$$\chi(i, j) = \sum_{p=1}^{N} F(i, p) * C(p, j) \qquad (2)$$

where i, j and p are indices. Examples of such functions are the Forward Discrete Cosine Transform (FDCT) and the Inverse Discrete Cosine Transform (IDCT) and Two Dimensional Discrete Fourier Transform (2-d DFT), and general matrix multiplication. Operations of the type illustrated by Eq. 2 are referred to generally as a Multiply-Accumulate, abbreviated as MA.

Because of the importance of MA operations in modern electronics, especially in communication electronics, there is an ongoing need for means and methods which permit MA operations to be carried out more quickly or with fewer resources or both. For example, it desirable to be able to perform such operations with simpler or more compact or higher speed microelectronic circuits or less on-chip memory or combinations of such advantages. It is especially desirable to be able to evaluate MA expressions such as Eqs. (1)–(2) using data scaling so that various quantities can be evaluated and manipulated more easily.

Computation of multiplications in the NORMAL domain can effectively be carried out as additions in the logarithmic domain. Then, all factors of the NORMAL domain have to be converted into the LOG domain. This is typically done by a LOG converter. The words "NORMAL domain" refer to real or complex numbers in any desired representation. The words "LOG domain" refer to numbers which are expressed in logarithmic notation and having a mantissa and exponent. Any basis can be used for the logarithms but base two is preferred.

Logarithmic converters are devices used to implement logarithmic functions and are most commonly found in items such as hand-held calculators and spread sheet software programs. Logarithmic functions, or LOG functions, belong to a class of mathematical functions called transcendental functions which are important in wide variety applications such as data communications, control systems, chemical processes, and computer simulation. A LOG function is abbreviated with the following mathematical equation: $y = \log_b(x)$. In this equation, x represents an input value which can be any number greater than or equal to zero; b represents a base number system; and y represents a logarithm value, or LOG value, which corresponds to the input value x.

Several techniques of computing LOG are commonly used today. A technique involves storing a corresponding LOG value in a look-up table for every possible input value. This approach allows a LOG value to be computed relatively quickly and is practical for applications requiring limited precision and having input values within a small domain. However, in many applications this technique is impractical because it requires too great a memory space to store the look-up table. For example, in a digital system using an IEEE standard 32-bit floating point number, which has a 23-bit mantissa, such a look-up table would be required to store $2^{23}$ LOG values—one for every possible mantissa value. A computer memory for storing this number of LOG values would be prohibitively expensive, if not impossible, to build.

Another technique of computing LOG values involves computing a power series to approximate a LOG function. An example of a power series which approximates a LOG function is given as:

$$y = \text{Log}(1+x) = x - x^2/2 + x^3/3 - x^4/4 + \qquad (3)$$

In this example, the LOG function is a specific type of LOG function known as a natural logarithm, which is widely used in science and engineering applications. The variables in Eq. (3) are defined as follows: y represents a LOG value, and x represents an input value in the domain $-1 \leq x < 1$. Although the technique of using a power series to approximate a LOG function allows a LOG value to be computed with a high degree of precision, it requires a large number of computer operations and therefore requires a relatively long period of time to execute. In other words, this technique is generally slow and negatively affects the throughput of a computer.

As used herein, the words "scaling" or "scaled" refer to multiplying or dividing a value or a series of values by a constant. Data which is subjected to "scaling" is said to have been "scaled".

In many applications there is a need to perform scalar multiplication of each input value of a large number of input values with a constant value. In digital signal processing (DSP) such scaling transformations are used for level adaption or in processing of video images, quantization scaling transformations are used for mapping a number space of a certain width to one of a different width. There is a need to perform such scalar multiplication in a very short time. As used herein the words "data" or "input data" or "output data" and the like are intended to refer to any type of quantity representable as a numerical value, irrespective of its physical significance. Thus, "data" includes coefficients, measurements, logical flags, and any other type information or constraint.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE PREFERRED EMBODIMENT

The present invention uses a combined system of determining logarithms, namely a polynomial approximation where the polynomial coefficients are retrieved from a look-up table depending on the input value. A converter for implementing logarithmic functions desirably includes a memory, a multiplier, and a number of adders with respect to the order of the polynomial. The memory stores a plurality of parameters and polynomial terms which are derived in the prefered embodiment using a least squares method to estimate a logarithmic function over a domain of input values. A method of computing the parameters and polynomial terms is also disclosed. The order of the polynomial can vary with the wanted degree of accurracy and the wanted size of the look-up table. First and second order polynomials have achieved good results, but higher order polynomials can be useful.

Figure 1:
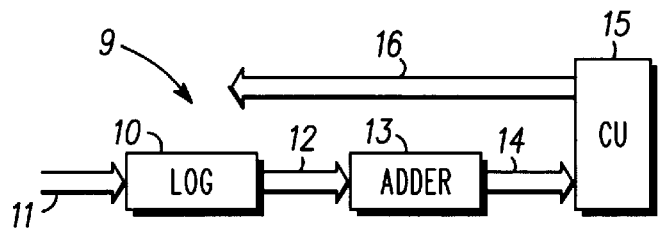
FIG. 1 illustrates schematically a processing system in accordance with a preferred embodiment of the present invention.

FIG. 1 illustrates processing system 9 in accordance with a preferred embodiment of the present invention. LOG converter LOG 10 receives input data via input bus 11 and converts them from the NORMAL to LOG input data of the LOG domain. These LOG input data are transferred via adder data bus 12 to adder 13. Adder 13 adds a LOG constant from its memory to the LOG input data generating LOG sums. LOG sums are transferred via CU-bus 14 to computing unit CU 15. CU 15 performs mathematical operations in the LOG domain upon the LOG sums and converts the result to the NORMAL domain thereby generating output data. Output data are output via output bus 16.

In a preferred embodiment, the adder can be integrated within the LOG converter. Such a LOG converter in accordance with a preferred embodiment of the present invention will be described now.

Besides others, the present invention provides a converter for computing a LOG function. The converter comprises a memory and an arithmetic means. The memory stores a LOG constant and a plurality of parameters and second-order terms, wherein the parameters and terms are calculated preferably using a least squares method to estimate a LOG function over a domain of input values. The arithmetic means generates a LOG value, depending on the parameters and terms stored in the memory, by performing arithmetic operations on an input value and some of the parameters and second-order terms. In this description of the preferred embodiment a LOG converter mostly using second order polynomials will be described for conveniance and not intended to be limiting.

The converter can be easily re-configured to perform LOG functions, or functions having a different base number system or domain of input values, by loading the memory with a different set of parameter pairs and second-order terms. Persons skilled in the art will understand based on the explanation herein, how to make these variations.

FIG. 2 having parts A and B illustrates logarithm converter 18, 18' in accordance with a preferred embodiment of the present invention. Converter 18, 18' comprises memory 20, multiplier 22, first adder 24, and second adder 26. Memory 20 stores a plurality of second-order terms in second-order look-up table 32 and a plurality of parameter pairs. The parameter pairs and second-order terms are calculated using a least squares method to estimate a LOG function over an interval of input values. Each parameter pair has a zero-order parameter, which is stored in zero-order look-up table 28, and a first-order parameter which is stored in first-order look-up table 30. The logarithm converter 18 further comprises third adder 21 and constant memory 23.

The converter operates as follows. An input value 34 provides an address 35, 36 which is used to retrieve a corresponding parameter pair from the zero-order and first-order look-up tables 28, 30. In a preferred embodiment, the input value 34 is a binary value having a length of 23-bits, denoted by [22:0], wherein the most significant nine bits, [22:14], of the input value 34 are provided to the memory 20 as address 35, 36. Additionally, zero-order and first-order parameters 42, 44 are located in memory 20 at a common address 35, 36 which corresponds to input value 34.

Second order term address 38 is also derived from input value 34. Address 38 is used to retrieve second-order term 46 from second-order look-up table 32. In one embodiment of the present invention, input value 34 is a binary value having an upper portion and a lower portion, and second-order term 46 is retrievable from memory 20 using a first bit slice from the upper portion concatenated with a second bit slice from the lower portion.

Preferably, input value 34 has a length of 23 bits, denoted by [22:0], where the upper portion includes the most significant nine bits, [22:14], and the lower portion includes the remaining 14 bits, [13:0]. Persons skilled in the art understand that other values can be used for the input value length and the division between upper and lower portions. Address 38 is conveniently a nine-bit value, which preferably comprises the most significant four bits of the upper portion concatenated with the most significant five bits of the lower portion, i.e., bits [22:19][13:9] of input value 34. Other combinations can be used.

Memory 20 provides as output zero-order parameter 42, first-order parameter 44, and second-order term 26 which correspond to input value 34. In a preferred embodiment, zero-order parameter 42 is a 24-bit binary value, first-order parameter 44 is a 15-bit value, and second-order term 46 is a 9-bit value. A total of 512 parameter pairs and 512 second-order terms are preferably stored in memory 20. Other values can also be used.

Multiplier 22 multiplies first-order parameter 44 by bit slice 40 to produce a proportional term. Although bit slice 40 can include entire input value 34, in a preferred embodiment it includes the fourteen least significant bits, [13:0], of input value 34. First adder 24 sums the proportional term and second-order term 46 to produce a first sum. In turn, second adder 26 sums the first sum and zero-order parameter 42 to produce LOG input value 48.

Figure 2A:
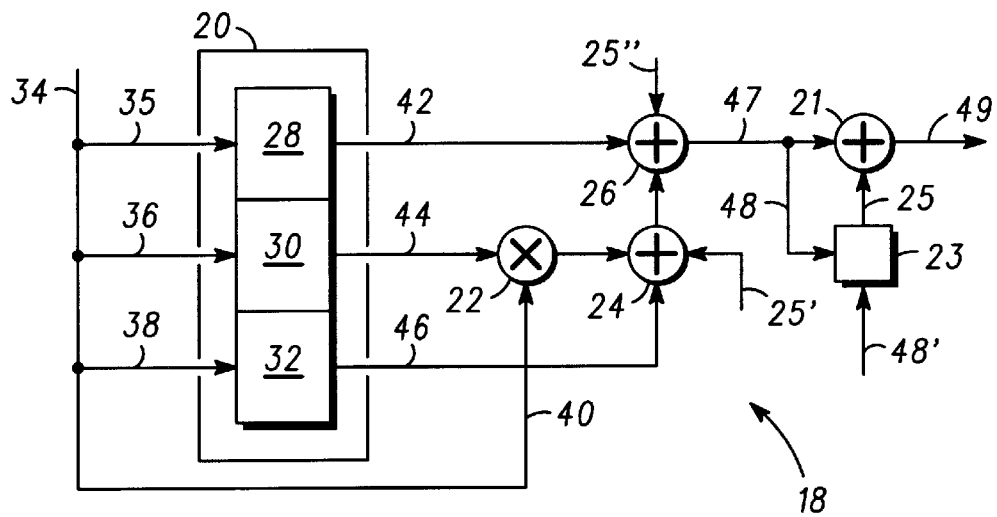
FIGS. 2A–2B illustrate a logarithm converter in accordance with various embodiments of the present invention.

In part FIG. 2A third adder 21 sums LOG input value 47 and LOG constant 25 stored in constant memory 23 to produce an output value 49. LOG constant 25 has been loaded previously as LOG input value 48. LOG constant 25 can also be separately loaded as indicated by 48'. Instead of having third adder 21 perform the addition of LOG constant 25, first adder 24 or second adder 26 can be chosen as multiple entry adders which receive LOG constant 25' or 25", respectively, to perform the addition. Output value 49 is preferably 23 bits in length, but this is not essential.

Figure 2B:
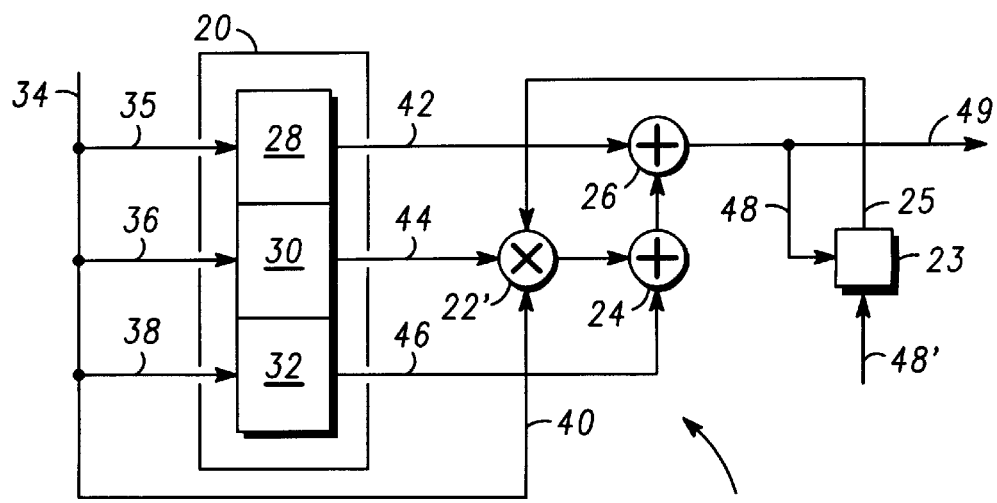

Part FIG. 2B shows another way of adding LOG constant 25 stored in constant memory 23 to produce an output value 49. Again, LOG constant 25 has been loaded previously as LOG input value 48. LOG constant 25 can also be separately loaded as indicated by 48'. Now, multiplier 22' comprises a multiplier-adder (e,g, see FIG. 8) for performing binary multiplications, which has an an additional input for LOG constant 25. Details of such a multiplier-adder are explained in connection with FIG. 8.

In one embodiment of the present invention, converter 18, 18' is implemented with an integrated circuit. However, one of ordinary skill will recognize that a programmable logic array, application specific integrated circuit (ASIC), or other digital logic device, as well as software running on a processor such as a microprocessor could also be used to implement the converter.

Figure 3:
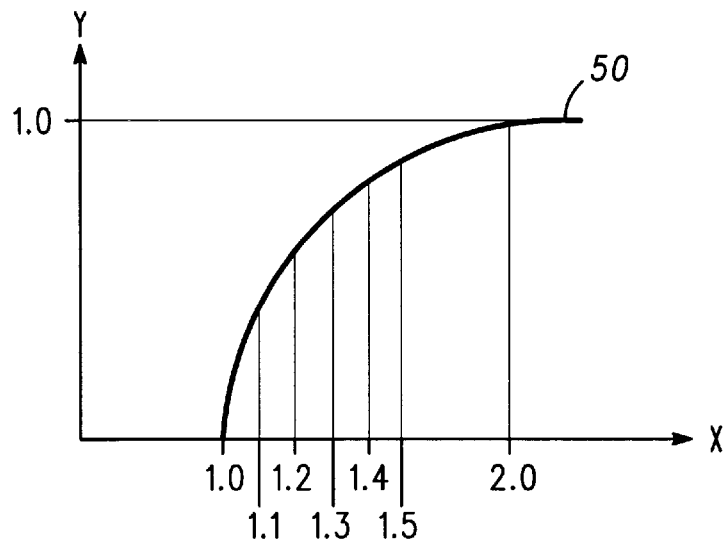
FIG. 3 shows schematically a graph of a logarithmic function.

FIG. 3 shows a graph of a logarithmic function 50 over a domain of input values. The input values are given along the x-axis and the LOG values are given along the y-axis. The domain of the input values is 1 to 2, and the range of the LOG values is 0 to 1. Several intervals within the domain are indicated with vertical lines at input values 1.1, 1.2, 1.3. 1.4, and 1.5. Each interval contains data points between the dotted lines. The LOG function 50 uses a base number system of two.

An IEEE standard 32-bit floating point number is easily converted to a LOG value using the converter of FIG. 2. Values represented by IEEE floating point numbers have one sign bit, a 23-bit mantissa, and an 8-bit exponent. Only the mantissa is provided to the converter as input value 34. Both the sign bit and exponent bypass the converter and are later combined with output value 49. Essentially, the converter computes $y=\log_2(1.M)$ or $\log_2^{-1}(1.M)$, where y represents the output value and M represents the mantissa and the subscript indicates base 2. The exponent of the floating point number is a base-two value, $2^e$, where e represents the exponent. A LOG value corresponding to the floating point number is generated by summing output value 49 and the exponent following conversion of the mantissa. This summation results in a value which is represented in a fixed point number format having a j-bit fractional portion and a k-bit integer portion. The integers j and k can vary, depending on the desired precision of the converter.

Figure 4:
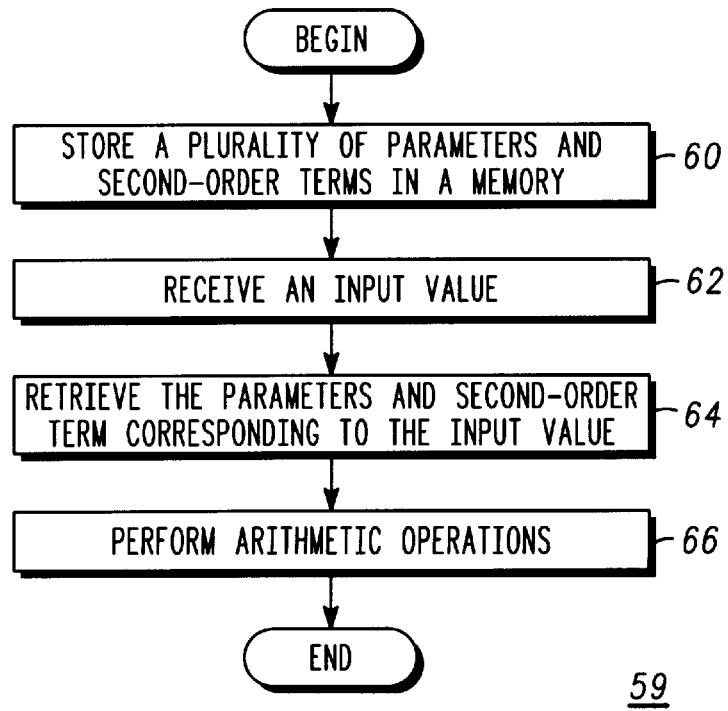
FIG. 4 illustrates a flow chart diagram of a method of using the logarithm converter shown in FIGS. 2A–B.

FIG. 4 illustrates a flow chart diagram of method 59 of using the logarithm converter shown in FIGS. 2A-B. Method 59 can be used for generating a LOG value. In step 60, a plurality of parameters and a plurality of second-order terms are stored in memory 20. The parameters are preferably calculated using a least squares method to estimate a LOG function, but other methods well known in the art can also be used. In step 62, an input value 34 is received. Next, in step 64, parameters and second-order term 46 which correspond to input value 34 are retrieved from memory 20.

In step 66, arithmetic operations are performed on the retrieved parameters, second-order term 46, input value 34, and LOG constant 25 to produce output value 48. The retrieved parameters include zero-order parameter 42 and first-order parameter 44, and the arithmetic operations are performed as follows:

(A) First-order parameter 44 is multiplied by input value 34 to produce a proportional term. In a prefered embodiment of the present invention, first-order parameter 44 is multiplied by a bit slice of input value 34.

(B) The proportional term and second-order term 46 are summed to produce a first sum.

(C) The first sum, the zero-order parameter and LOG constant 25 are summed to produce output value 47, 49.

Figure 5:
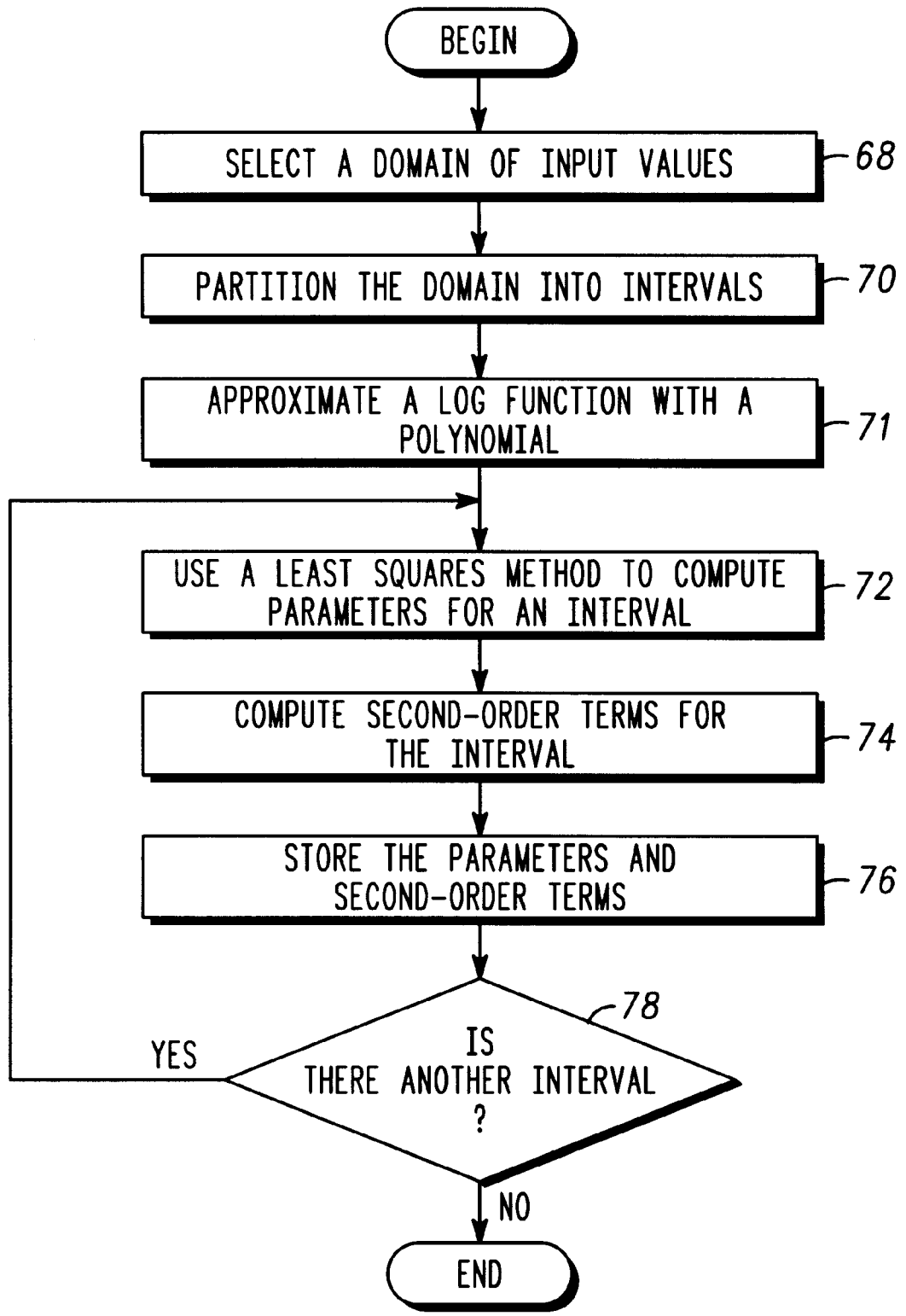
FIG. 5 illustrates a flow chart diagram of a method of computing and storing parameters and second-order terms used in conjunction with the converter of FIGS. 2A–B.

FIG. 5 illustrates a flow chart diagram of method 67 of computing and storing parameters and second-order terms used in conjunction with the converter of FIGS. 2A-B. Method 67 can be used for a LOG function. In step 68, a domain of input values is selected for the function. In step 70, the domain is partitioned into a plurality of intervals. In step 71, the function is approximated, over the domain of input values, with a second-order polynomial which has a plurality of parameters and a second-order term. Next, in step 72, the parameters for an interval are computed, preferably using a least squares method. In step 74, a second-order term for each possible input value within the interval is computed, thereby producing one or more second-order terms for the interval. Next, in step 76, the parameters and second-order term for the interval are stored in the memory 20. In query step 76 a check is made to determine whether parameters and second-order terms are to be calculated for any additional intervals. If so, the procedure returns to step 72. If not, the procedure terminates.

In a preferred embodiment of the present invention, LOG functions are approximated with a second order polynomial having the form:

$$y=b_0+b_1x+b_2x^2 \quad (4)$$

where y represents the LOG value, $b_0$ represents the zero-order parameter, $b_1$ represents the first-order parameter, $b_2$ represents a second-order parameter, x represents an input value, and $b_2x^2$ represents the second-order term.

The domain of input values is partitioned into 512 intervals which each contain $2^{14}$ data points. For each interval, the parameters $b_0$, $b_1$, and $b_2$ are calculated using a second order regression on the data points. Rather than storing the second-order parameter along with the zero-order and first-order parameter, a selected number of second-order terms are stored instead. The second-orders terms which are stored are empirically determined by observing the variance of the second-term over the domain of input values. This eliminates the need for an addition multiplier and a squaring means to produce the second-order term. Further, this allows second-order terms having the same value at different input values to reside at a common address in memory 20.

Now, parallel processing systems according to the present invention are described to demonstrate the advantages of the invention.

It has been found that Eqs. (1)–(2) can be evaluated very efficiently by means of computer system 110, 110' shown in FIGS. 6–7 employing K parallel calculating means (individually "k").

Figure 6:
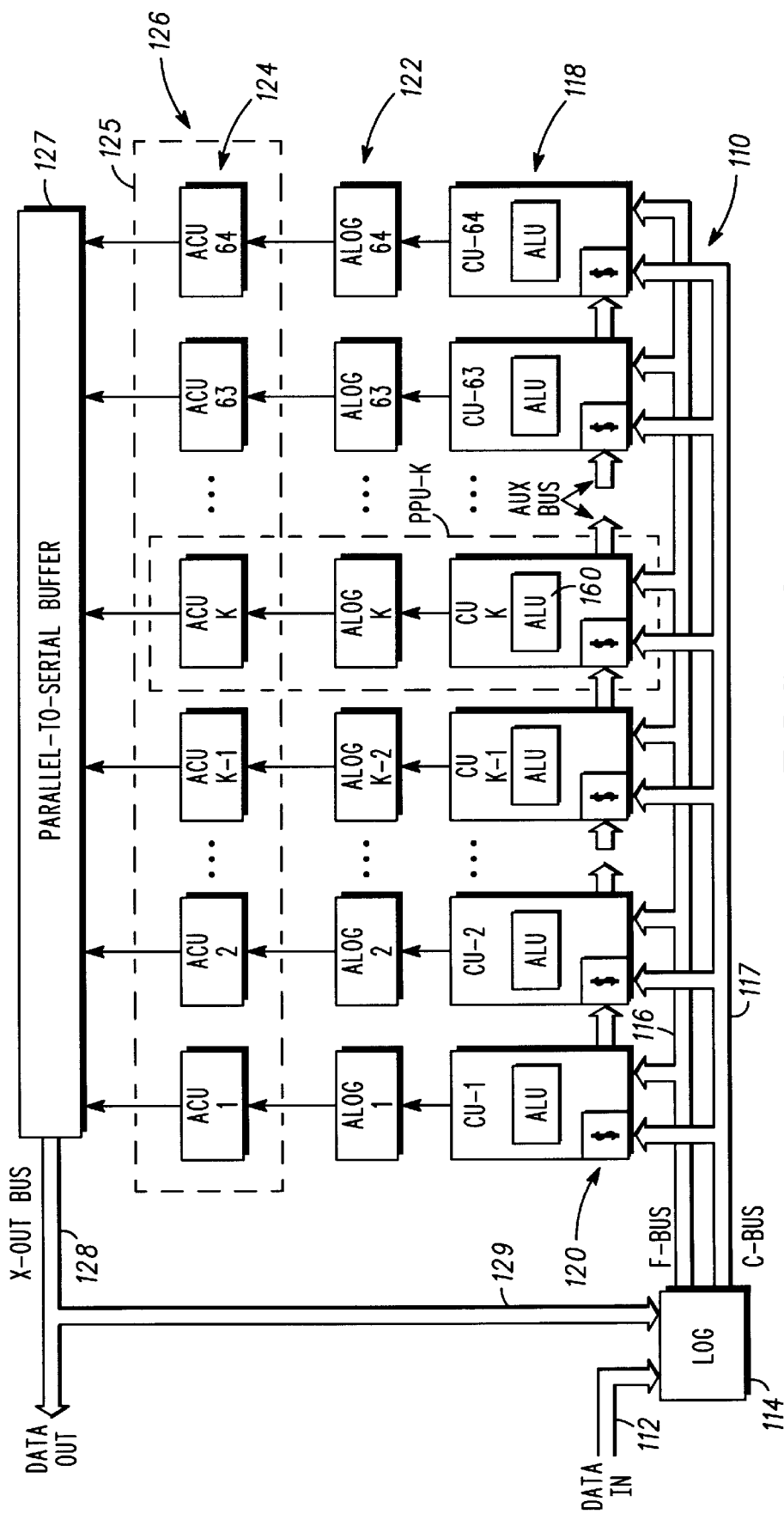
FIG. 6 is a simplified block diagram of a computational system according to the present invention.
Figure 7:
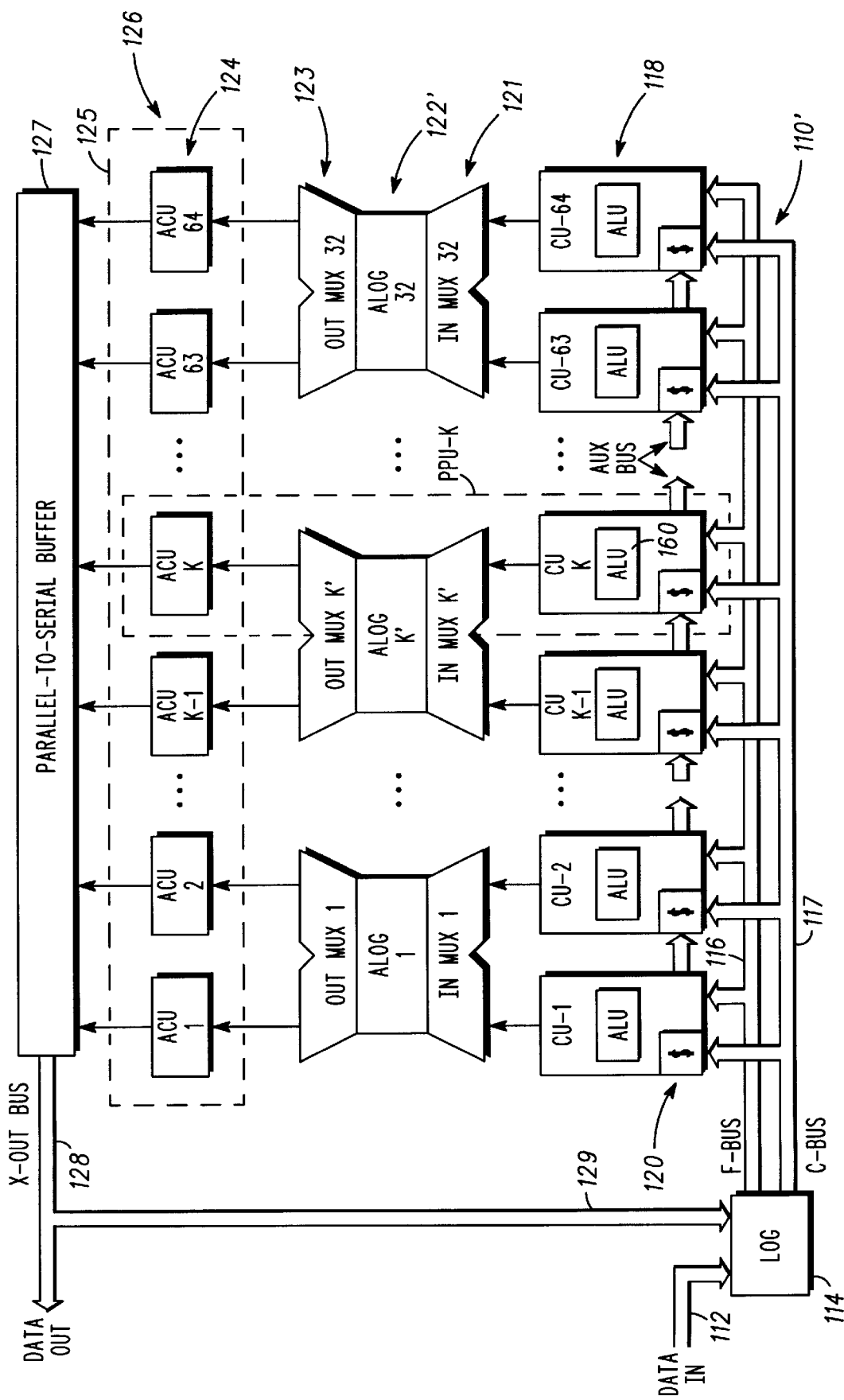
FIG. 7 is a simplified block diagram of a computational system according a further embodiment of the present invention.

FIG. 6 is a simplified block diagram of parallel processing system 110 according to the present invention. FIG. 7 is similar to FIG. 6 but according to a further embodiment denoted by system 110'. Like reference numbers identify like elements in the figures and primed reference numbers (e.g., 110, 110'; 122, 122') or letters (e.g., k, k') in FIGS. 6–7 identify functionally equivalent elements.

System 110, 110' accepts input data in the NORMAL domain and, preferably, provides output data in the NORMAL domain. However, internally, a portion of the data processing occurs in the LOG domain. The input data and output data can represent any desired quantity. The system is especially useful, for example, for the processing of video and other information where the input data represents quantized pixel elements in an array or subarray of an image. However, many other types of input data can be processed with the system and method of the present invention and this example is not intended to be limiting. Various features of systems generally similar to system 110, 110' are described in copending applications or patents [1]–[7] and further details can be found therein. However, the explanation included here is sufficient for those of skill in the art to understand and practice the present invention without undue experimentation.

Input data or coefficient values in the NORMAL domain present on system input bus 112 are delivered to LOG unit 114. LOG unit 114 converts the NORMAL input data or coefficients (e.g., real or imaginary numbers) into, preferably, fixed point logarithms having exponent and mantissa, LOG input data. LOG unit 114 further adds a LOG constant to the LOG input data generating LOG sums according to the means and method already described. LOG sums are exported to system internal bus 116 (F-BUS). LOG coefficients are preferably exported to cache bus 117 (C-BUS) for transfer to cache memory 120 but, as is explained later, this is only one of several ways for loading coefficients.

F-BUS Bus 116 couples the LOG sums to calculation units (CU's) 118. In the examples of FIGS. 6–7, processor 110, 110' has K=64 CU's identified as CU-1 to CU-64. CU-k refers to the kth calculation unit (CU). PPU-k refers to the kth parallel processing unit (PPU) or means. For example, PPU-k denotes the combination of CU-k and its associated antiLOG unit (ALOG-k or ALOG k') and accumulator unit (ACU-k). In system 110' of FIG. 7, multiplexers 121 (e.g., IN-MUX k' and OUT-MUX k') are placed at the input and output of ALOG k' so that adjacent CU's and ACU's (e.g., CU-k and CU-(k–1), ACU-k and ACU-(k–1)) can share a common ALOG-k'. Thus, in FIG. 7, there are half as many ALOG units as in FIG. 6. Otherwise the operation of systems 110 and 110' are substantially the same. The implementation of FIG. 7 is preferably when total chip area is relatively more important than execution speed and the implementation of FIG. 6 is preferable when execution speed is relatively more important than chip area. Persons of skill in the art understand how to balance conflicting demands. Larger or smaller numbers of CU's can also be used and the number $k_{max}$=K=64 shown here is merely for convenience of explanation and not intended to be limited.

It is preferable that each CU 118 has cache memory 120, identified by the symbol "$". In the preferred embodiment, memory 120 in each CU has 128 rows of 34 bit words per row of associative SRAM. Memories 120 taken together can be viewed as one big cache memory of 128 rows of 34 bit words in 64 columns, where each column is associated with one CU and PPU. However, larger or smaller amounts of memory can be included in cache 120. A system buffer memory (not shown) can be used in connection with input bus 112 or output bus 128 or both to provide storage for input or output data or both, but this is not essential.

LOG sums values are loaded into CU's 118 from F-BUS 116. Coefficient values (e.g., in the LOG domain) can be loaded in caches 120 from F-BUS 116 or via separate C-BUS 117. Either arrangement is useful. Coefficient values can also be transferred from CU-k to or from and adjacent CU-(k±1) via an auxiliary bus (e.g., AUX-BUS in FIGS. 1–2), but that is not essential for the present invention. Coefficient values are preferably stored in cache 120 in the LOG domain, but this is not essential. What is important is that they be in the LOG domain when provided to arithmetic logic unit (ALU) 160 of each CU. For convenience of explanation it is assumed in the discussion that follows that they are stored in cache 120 in LOG domain form.

CU's 118 have their outputs coupled to ALOG units 122, 122' which take the anti-LOG of the intermediate LOG values provided by CU's 118 and produce at their outputs corresponding values in the NORMAL domain. The output of each ALOG-k is coupled to the input of a corresponding accumulator unit (ACU-k) 124. In FIG. 4, k'=k/2 for k even.

ACU's 124 can function as individual adders, e.g., one for each PPU-k, or can be interconnected as indicated by the dashed outline 125 to form adder tree 126, depending upon the combination of Multiply-Multiply (MM) terms desired to be accumulated by the user. Examples of various adder trees are shown in several of the incorporated references [1]–[7], but other adder tree formulations well known in the art can also be employed.

The outputs of ACU's 124 or adder tree 126 are coupled to Parallel-to-Serial Buffer (PTSB) 127. In the preferred embodiment, PTSB 127 has 64 input taps in FIGS. 6–7, and provides the system output on X-OUT BUS 128. The system output is preferably in the NORMAL domain. The output can be coupled back to LOG unit 114 via bus 129, according to the function desired to be evaluated by system 110, but this is not essential.

It is assumed hereafter that the arrangement of FIG. 6 is used and references to system 110 are intended to include system 110'. This is merely for convenience of explanation and people of skill in the art will understand that either arrangement works. Other modifications to the arrangement of system 110, which will be apparent based on the description herein, can also be made.

In system 110, 110', it is important that LOG unit 114 function efficiently. It is also desirable that the input data be able to be scaled so as the facilitate processing by the PPU-k. It has been found that scaling can be efficiently incorporated in LOG unit 114 without adding significant additional circuitry. This is of great practical utility since it reduces the chip area that would otherwise be consumed in providing additional multipliers or additional LOG domain adders in the data path to provide scaling of the data.

Figure 8:
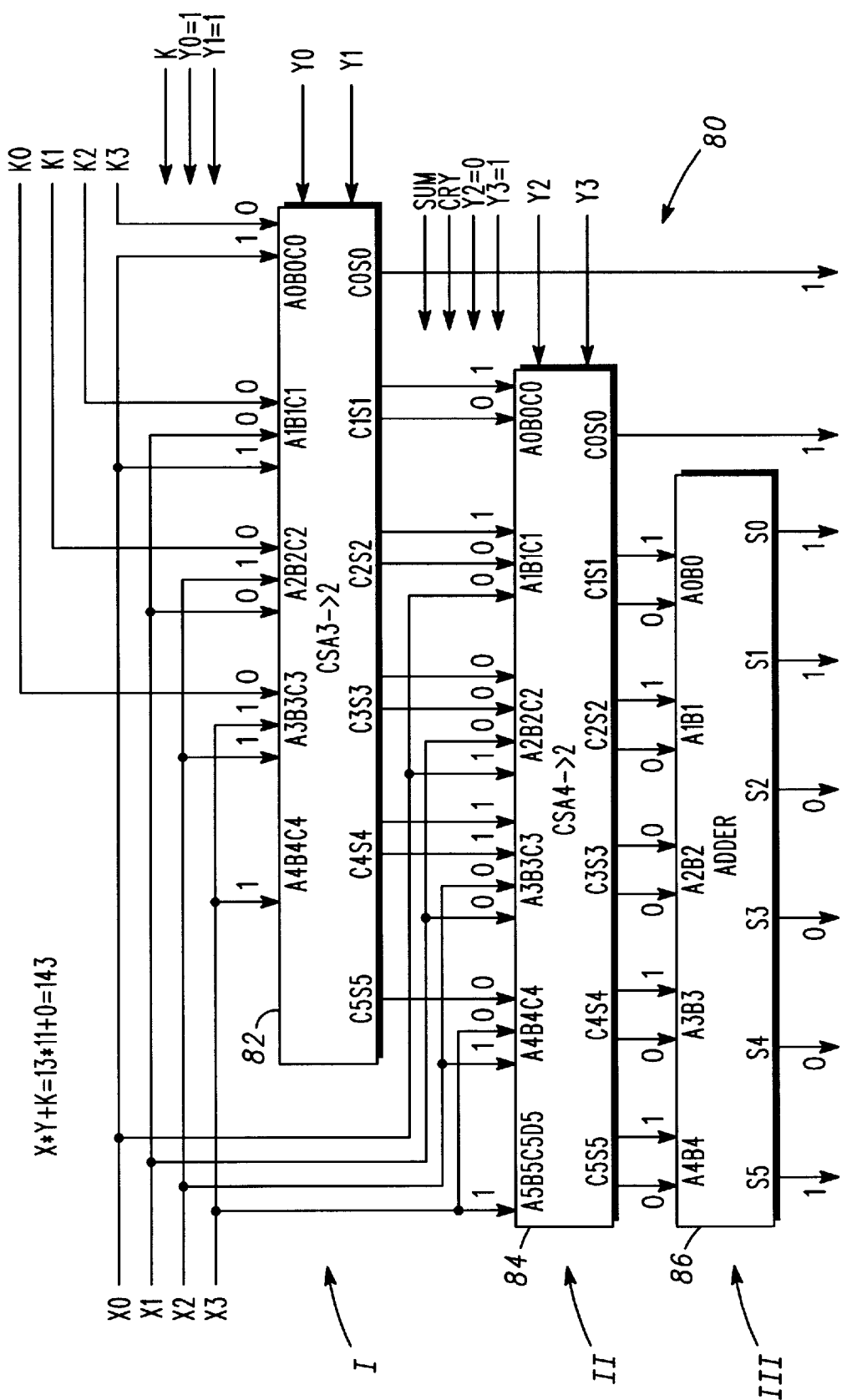
FIG. 8 is a simplified block diagram illustrating a multiplier-adder assembly according to a prefered embodiment of the present invention.

FIG. 8 is a schematic diagram of adder stage cascade 80 of carry-save-adders providing further detail of a preferred embodiment of the present invention. In such cases where a LOG converter is used which computes the LOG input data with a polynomial using an arithmetic means as explained in detail above, the arithmetic means can perform a multiplication. Adder stage 80 then corresponds to multiplier 22, 22' of FIGS. 2A-B. Such multiplications are performed with a cascade of binary 20 adders. The construction of carry-select-adders (CSAs) is known to those skilled in the art. According to the invention, otherwise unused inputs in adder stage 80 are utilized to add the LOG constant during the generation of the LOG input data from the polynomial terms. In this way the LOG constant is added without providing an additional adder and without additional time for adding the LOG constant. This is of great practical significance.

In FIG. 8, adder stage cascade 80 for performing an operation X*Y+K of, for example, four-bit numbers, is shown. Cascade 80 has first and second stages I, II with carry- select -adders (CSAs) 82, 84, respectively, and third stage III with full adder 86. Each CSA 82, 84, and the full adder 86 have multi-bit inputs marked with letters (e.g. A, B, C . . . ) and the index of the respective bit, and outputs for sum and carry bits (CSAs only), marked S and C and the index of the respective bit, respectively. Stage I CSA 82 is a 3→2 CSA reducing three input values to two output values. Stage II CSA 84 is a 4→2 CSA reducing four input values to two output values. Stage III full adder 86 adds two input values to produce one output value.

It is shown by way of example how the input values X, Y, and k are processed to generate the final output X*Y+K for X*Y+K=13*11+0=143. CSA entries having no input line always receive a zero as default. The multiplication of X by Y is done by feeding X repeatedly to the CSAs shifted by one bit each time and multiplexed (muxed) by the value of the respective bit (0/1) of the input value Y. Input value K enters at entry C, while input value X enters at entries A and B of CSA 82. $Y_0$ controls B inputs and $Y_1$ controls A inputs of CSA 82. This has the effect of performing a one-bit left-shift of the X values. Stage I CSA 82 performs multiplication of X with bits $Y_0$ and $Y_1$, and addition of K. This provides the least significant bit (LSB) of the result, namely output $S_0$ of CSA 82, while output $C_0$ of CSA 82 carries no information. The other output bits of CSA 82 are submitted to stage II CSA 84 (output $S_5$ of CSA 82 carries no information).

Stage II CSA 84 receives X at entries A and B shifted by two and three bits, respectively, and carry C and sum S values of stage I at entries C and D, respectively. $Y_2$ controls B inputs and $Y_3$ controls A inputs of CSA 84. This has the effect of performing a three-bit and four-bit left-shifts of the X values. Again, the muxing by the value of the respective bits of the input value Y, namely $Y_2$ and $Y_3$, is denoted on the right in combination with noting the actual input values of each input line. Note that because $Y_2$ is zero after the muxing, all bit entries of B of CSA 84 will receive zeros. Again one bit of the result is provided, and the other output bits of CSA 84 are submitted to stage III full adder 86 which provides the rest of the result bits (outputs $C_0$, $S_1$ of CSA 84 carry no information).

The Y values control the operation of CSA I and II. When $Y_i=1$, then the corresponding X values are input to the respective CSA inputs and when $Y_i=0$ they are not (i.e. only "0"'s are entered). This is referred to as muxing the X inputs. FIG. 8 illustrates how X=13+(1101) in binary representation is multiplied by Y=11+(1011) in binary representation and addet to K=0=(0000) to obtain 143=(10001111) on binary notation.

Having thus described the invention, those of skill in the art will understand that the invented means and method can be used in connection with many applications of great practical significance and that it is not limited merely to the application and arrangement described here for purposes of illustration and explanation. Accordingly, it is intended to include those further applications and arrangements that fall with the scope of the claims that follows, as understood and practiced by those of skill in the art.

We claim:

1. A method for generating a LOG value, which method comprises the following steps:

receiving input data;

retrieving from a memory a plurality of parameters and a polynomial term which corresponds to the input data;

estimating a LOG function of the input data based upon a polynomial which includes plurality of parameters and the polynomial term to produce a LOG input data value;

adding a LOG scaling constant to the LOG input data value to produce the LOG value;

performing arithmetic operations in the LOG domain on the LOG input data value to generate output data; and performing an inverse LOG operation on the output data.

2. The method of claim 1, further comprising the following steps:

a) computing the plurality of parameters with the least squares method;

b) computing the polynomial term for each possible input data within the interval, whereby producing a plurality of polynomial terms; and c) storing the plurality of parameters and the plurality of polynomial terms in the memory.

3. The method of claim 2, wherein the step of storing includes storing ones of the plurality of polynomial terms having a same value at a common address in the memory.

4. The method of claim 2, further comprising the following steps:

selecting a domain of input values for the LOG value;

partitioning the domain into a plurality of intervals; and repeating steps (a)–(d) for each of the plurality of intervals.

5. The method of claim 1, wherein the plurality of parameters include polynomial parameters, and the step of performing arithmetic operations includes the following substeps:

multiplying higher than zero-order polynomial parameters by the input data to produce polynomial terms;

summing pairwise polynomial terms, a zero-order parameter, and the LOG constant to produce first sums; and summing the first sums to produce the LOG value.

6. The method of claim 1, wherein the plurality of parameters include polynomial parameters, and the step of performing arithmetic operations includes the following substeps:

multiplying the higher than zero-order polynomial parameters by a bit slice of the input data to produce polynomial terms;

summing pairwise proportional terms, a zero-order parameter, and the LOG constant to produce first sums; and summing the first sums to produce the LOG value.

7. A logarithm converter, which comprises:
a memory for storing a LOG scaling constant and a plurality of parameters and a plurality of polynomial terms, wherein the parameters and the plurality of polynomial terms estimate a logarithmic function over a domain of input values, the memory providing as output ones of the parameters and polynomial terms which correspond to an input data; and
arithmetic means, operatively coupled to the memory, for generating a LOG input data value by performing arithmetic operations on the input data, the ones of the parameters, and the polynomial terms, the arithmetic means further adding the LOG scaling constant to the LOG input data value to generate a LOG value.

8. The logarithm converter of claim 7, wherein the ones of the plurality of parameters include a zero-order parameter and a higher-order parameters, and the arithmetic means includes:
a multiplier for multiplying the higher-order parameters by the input data to produce the plurality of polynomial terms;
an adder tree for summing the zero-order parameter, the polynomial terms and the LOG constant to produce the LOG value.

9. A computing device, which comprises:
a processing unit for executing a computer operation which utilizes a LOG value;
a computer memory for storing a computer program which includes the computer operation;
a bus for coupling the processing unit and the computer memory; and
a logarithm converter which receives input data and includes:
a memory for storing a LOG scaling constant and a plurality of parameters and a plurality of polynomial terms, wherein the parameters estimate a logarithmic function over a domain of input values, the memory providing as output ones of the parameters and one of the polynomial terms which correspond to the input data; and
arithmetic means, operatively coupled to the memory, for generating the LOG value by performing arithmetic operations on the input data, the ones of the parameters, and the one of the polynomial terms, the arithmetic means further adding the LOG scaling constant to the input data to generate a LOG value.

10. A method for signal processing in a processing system having a logarithmic converter which receives input data, an adder unit, coupled to the logarithmic converter, and a computing unit, coupled to the adder unit, comprising the steps of:
converting input data from NORMAL domain input data into LOG domain input data by estimating a logarithmic function over a domain of input values with a polynomial using a plurality of parameters and at least one polynomial term;
adding a LOG domain scaling factor constant value to the LOG domain input data to produce scaled LOG domain data; and
performing mathematical operations on the scaled LOG domain data and converting the result data back to the NORMAL domain to provide NORMAL domain output data.

11. A processing system comprising:
a logarithmic converter which receives input data for converting input data from the NORMAL domain into the LOG domain by estimating a logarithmic function over a domain of input values with a polynomial which includes a plurality of parameters and at least one polynomial term;
an adder unit, responsive to the logarithmic converter, for adding a constant scaling value to the LOG domain data; and
a computing unit, coupled to the adder unit, for performing mathematical operations within the LOG domain and converting the result back to the NORMAL domain.

12. The processing system of claim 11, wherein the processing system comprises a memory for storing the constant value.

13. The processing system of claim 11, wherein the logarithmic converter includes the adder unit.

14. The processing system of claim 11, wherein the logarithmic converter has a memory containing a look-up table with polynomial coefficients, and performs the LOG conversion with the polynomial using the polynomial coefficients and adding a constant value to the LOG domain data while the LOG domain data are being generated.

15. The processing system of claim 11, wherein the processing system further comprises a data bus system for transmitting the input data during their computation and a coefficient bus system different from the data bus system for transmitting the constant value to add to the LOG domain data as well as coefficients for performing mathematical operations within the LOG domain upon the input data.

16. An electronic system comprising:
a logarithmic converter which receives a stream of input data, for converting input data from the NORMAL domain into the LOG domain by estimating a logarithmic function over a domain of input values with a polynomial using a plurality of parameters and at least one polynomial term;
an adder unit, coupled to the logarithmic converter, for adding a LOG domain value of a scaling factor to the LOG domain data; and
a computing unit, coupled to the adder unit, for performing mathematical operations within the LOG domain and converting the result back to the NORMAL domain.

17. The electronic system of claim 16, wherein the addition of the LOG domain value of the scaling factor is added to only a mantissa of the LOG domain data.

18. The electronic system of claim 17, wherein the logarithmic converter has a memory containing a look-up table with polynomial coefficients, and an adder tree to perform the LOG conversion with the polynomial using polynomial coefficients and adding a constant value to LOG domain data.

19. The electronic system of claim 17, wherein the adder unit comprises carry save adders which get as input partial products of the polynomial and the scaling factor.

20. The electronic system of claim 16, wherein the adder unit comprises an adder stage cascade having carry-select-adders (CSAs) for performing an operation $X*Y+K$ of binary numbers, one CSA stage having entries for receiving X and K.

* * * * *